(12) United States Patent
Janiszewski

(10) Patent No.: US 12,717,376 B2
(45) Date of Patent: Aug. 25, 2026

(54) ADJUSTABLE SUNSHADE FOR ELECTRONICS

(71) Applicant: RipaLip, LLC, Eden Prairie, MN (US)

(72) Inventor: David A. Janiszewski, Eden Prairie, MN (US)

(73) Assignee: RipaLip, LLC, Eden Prairie, MN (US)

( * ) Notice: Subject to any disclaimer, the term of this patent is extended or adjusted under 35 U.S.C. 154(b) by 175 days.

(21) Appl. No.: 18/311,996

(22) Filed: May 4, 2023

(65) Prior Publication Data

US 2023/0359239 A1 Nov. 9, 2023

Related U.S. Application Data

(60) Provisional application No. 63/338,205, filed on May 4, 2022.

(51) Int. Cl.
*G06F 1/16* (2006.01)

(52) U.S. Cl.
CPC .......... *G06F 1/1603* (2013.01); *G06F 1/1629* (2025.01); *G06F 1/16* (2013.01); *G06F 1/163* (2013.01); *G06F 1/1633* (2013.01)

(58) Field of Classification Search
None
See application file for complete search history.

(56) References Cited

U.S. PATENT DOCUMENTS 3,733,436 A * 5/1973 Rose .................... H04N 5/65 348/E5.131
3,849,598 A * 11/1974 Hoffberger, II .......... H04N 5/65 348/E5.131
4,784,468 A * 11/1988 Tierney .................... H04N 5/65 348/E5.131
4,865,420 A * 9/1989 Schmidt ............... G02B 27/028 348/E5.131
5,069,529 A * 12/1991 Takahashi .............. G02B 27/04 348/E5.131
5,121,253 A * 6/1992 Waintroob ............ G06F 1/1603 348/E5.131
5,218,474 A * 6/1993 Kirschner ................ H04N 5/65 348/E5.131
5,243,463 A * 9/1993 Waintroob ............... H04N 5/65 348/E5.131
5,528,424 A * 6/1996 Lentz ....................... H04N 5/65 359/612
6,065,841 A * 5/2000 Heller ................... H01J 29/896 359/601
6,144,419 A * 11/2000 Schmidt ................... H04N 5/65 348/E5.131

(Continued)

*Primary Examiner* — Phi D A
(74) *Attorney, Agent, or Firm* — Lathrop GPM LLP; Tucker Griffith; Stephanie Vu

(57) ABSTRACT

The invention relates to an adjustable sunshade for shielding against sun, rain, snow, ice and other weather conditions. In particular, the adjustable sunshade includes a top panel pivotably coupled with side panels for moving between a folded position and an unfolded position. Further, the adjustable sunshade includes a flexible belt for securing to a perimeter of an electronics unit, such as marine electronics. Advantageously, the adjustable sunshade may be configured to accommodate electronic units of varying size and dimension to, for example, reduce the glare and provide protection from various weather and ambient conditions.

20 Claims, 4 Drawing Sheets

(56) References Cited

U.S. PATENT DOCUMENTS

| | | | | |
|---|---|---|---|---|
| D504,899 | S * | 5/2005 | Ellis | D14/450 |
| 8,328,372 | B2 * | 12/2012 | Luo | G06F 1/1603<br>359/601 |
| 2007/0184691 | A1 | 8/2007 | Perkins | |

* cited by examiner

ADJUSTABLE SUNSHADE FOR ELECTRONICS

CROSS-REFERENCE TO RELATED APPLICATIONS

This application claims benefit of U.S. application Ser. No. 63/338,205 filed on May 4, 2022, which is incorporated by reference in its entirety.

FIELD OF THE INVENTION

The present invention generally relates to a protective sunshade or visor and, more particularly, to an adjustable sunshade that is configured to accommodate electronics of varying size and dimension for shielding against sun, rain, snow, ice and other weather conditions.

BACKGROUND

Fishermen that use the fishing technique of angling are often referred to anglers. Regardless of expertise level, anglers commonly rely on marine electronics for various purposes, such as navigating a boat, locating fish, and detecting structures.

Over the last 15 years, there have been numerous advances in marine technology for use in the fishing industry. For example, traditional sonar image quality has improved, including improvements to downscan technology enhancing the images of bottom structure, and sidescan sonar technology providing the angler with the ability to see hundreds of feet to the right and left their boat. Recently, the addition of live technology to marine electronics facilitates showing anglers fish and bait movement in real time.

Marine electronics often come in different shapes, sizes, and constructions, including variations in display screen size, resolution, and screen material (typically glass) make-up. Despite recent improvements, however, marine electronics—e.g., fish locators, radar, and navigation displays—are still difficult to read in direct sunlight.

In particular, live transducer signals are especially difficult to read in reflective sunlight. For example, while ice fishing, bright sunlight and the reflection off the snow can severely impede an angler's ability to see a display screen. Further, during operation of a boat, rain and splash may impede visibility on the screen.

Conventional sunshade or protective visor offering shade and a barrier from the elements are available. However, such conventional devices are often poorly constructed or ineffective. For example, conventional visors are generally made from a single plastic part that must be permanently attached to the marine electronics head unit, such as described in U.S. Patent Application Publication No. 2007/0184691 to Perkins. Using such a device requires anglers to remove the marine electronics screen bezel and attach the visor through hardware, which may damage the system.

Further, conventional devices may not be adjustable and are often difficult to remove once installed. Specifically, conventional devices generally fail to accommodate electronics systems of varying shapes and sizes. For example, once installed to an electronics system, conventional visors conform to the shape of the system and cannot be reshaped to fit a different monitor. As a result, conventional devices are often permanently attached to the electronics system. When permanently attached, the visor can also get in the way of the angler.

Accordingly, there is a need for a protective sunshade or visor for use with marine electronics that is adjustable, easy to install and uninstall, as needed, and configured to accommodate various electronics systems. The present invention satisfies this need.

The invention relates to an adjustable sunshade for shielding against sun, rain, snow, ice and other weather conditions. In particular, the adjustable sunshade includes panels and a flexible belt. Advantageously, the adjustable sunshade may be secured to or detached from electronic units of varying size and dimension efficiently and effectively.

In one aspect, the adjustable sunshade includes a top panel, a left panel, and a right panel. Left panel and right panel may be pivotably connected to the top panel for movement of the adjustable sunshade between a folded position and an unfolded position. Further, the top panel may be secured to a flexible belt via a continuous seam. The flexible belt may be configured to be removably secured around a perimeter of an electronic unit.

The flexible belt may include one or more ends configured to removably couple with a surface of the belt. For example, a tongue at an end of the belt may include hook and loop fasteners configured to engage with hook and loop fasteners on the surface of the belt to secure the belt to the perimeter of the electronic unit. Further, the belt may include a non-slip material for gripping the perimeter of the electronic unit. Further, two or more straps may be coupled to the belt. The straps may include fasteners with male and/or female connectors for attaching across a back surface of the electronic unit.

The belt may include a reinforcement stitch along its perimeter. The reinforcement stitch maybe sewn to add rigidity, such as during installation of sunshade. Further, the reinforcement stitch may provide additional structure and prevent excessive stretching of the belt. Once installed, the top panels and side panels may be unfolded to define a space for viewing a screen of the electronic unit and extend a distance from the electronic unit to, for example, protect and/or shade a screen of the electronic unit. In the unfolded position, each side panel may be removably attached to the belt such that each side panel is positioned generally normal to the top panel.

In the folded position, the adjustable sunshade may be used to cover the electronic unit. In particular, in the folded position, side panels are configured to detach from the belt and fold flat against a bottom surface of the top panel. Then, top panel and side panels may be folded flush against the screen of the electronic unit to, for example, act as a screen protector.

In another aspect, the adjustable sunshade may include a top panel having a back edge, a left edge, and a right edge. A left panel of the sunshade may include a right edge and a rear edge. The rear edge of the left panel may pivotably couple to the left edge of the top panel. Further, a right panel of the sunshade may include a left edge and a rear edge. The left edge of the right panel may be pivotably coupled to the right edge of the top panel.

The adjustable sunshade may further include a flexible belt connected to the rear edge of the top panel via a continuous seam. The belt may further removably couple with the left and right panels via a hook and loop fastener running along the rear edge of the side panels.

The flexible belt may be configured to be secured to a perimeter of an electronics unit. In particular, one or more ends of the belt may fasten with a surface of the belt for securing to the electronic unit. For instance, a tongue at an end of the belt may include hook and loop fasteners configured to engage with hook and loop fasteners on the surface of the belt. Moreover, the belt may couple with two or more straps. The straps may be configured to connect across a back surface of the electronic unit.

The top, left, and right panels are configured to move between a folded and unfolded position. In the folded position, an interior surface of left and right panels may fold flat against a bottom surface of the top panel. Then, the panels may be folded such that an exterior surface of the side panels is flush against a screen of the electronics unit.

In the unfolded position, the rear edges of the side panels are configured to removably couple to the belt such that each side panel is generally normal to the top panel. Once unfolded, the adjustable sunshade may facilitate protecting the electronic unit, such as marine electronics, from sun, rain, snow, ice and other weather conditions.

While the invention is susceptible to various modifications and alternative forms, specific exemplary embodiments thereof have been shown by way of example in the drawings and have herein been described in detail. It should be understood, however, that there is no intent to limit the invention to the particular embodiments disclosed, but on the contrary, the intention is to cover all modifications, equivalents, and alternatives falling within the scope of the invention as defined by the appended claims.

BRIEF DESCRIPTION OF THE DRAWINGS

Embodiments are illustrated by way of example and not limitation in the figures in the accompanying drawings, in which like references indicate similar elements and in which.

DETAILED DESCRIPTION OF THE INVENTION

The present invention generally relates to a protective sunshade or visor and, more particularly, to an adjustable sunshade that is configured to accommodate electronics of varying size and dimension. Advantageously, the adjustable sunshade may facilitate shielding electronics, such as marine equipment, from sun, rain, snow, ice and other weather conditions. Although the non-limiting examples described in the present application refer to an adjustable sunshade for use with marine equipment, other electronic units are contemplated, such as laptops, tablets, monitors, and the like.

Figure 1:
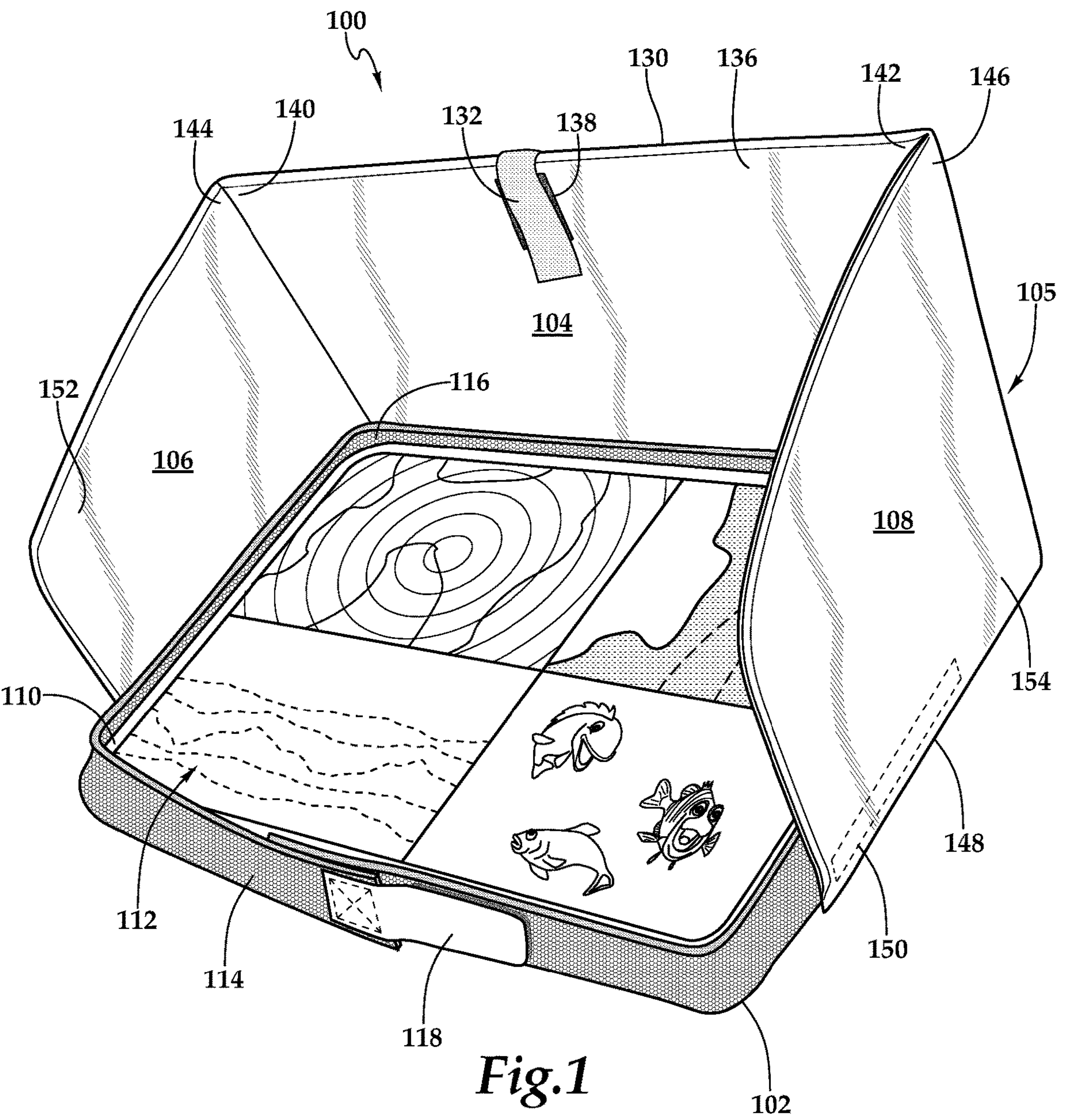
FIG. 1 is a perspective view illustrating an exemplary adjustable sunshade in an open position including panels for shading or protecting an electronic unit.
Figure 4:
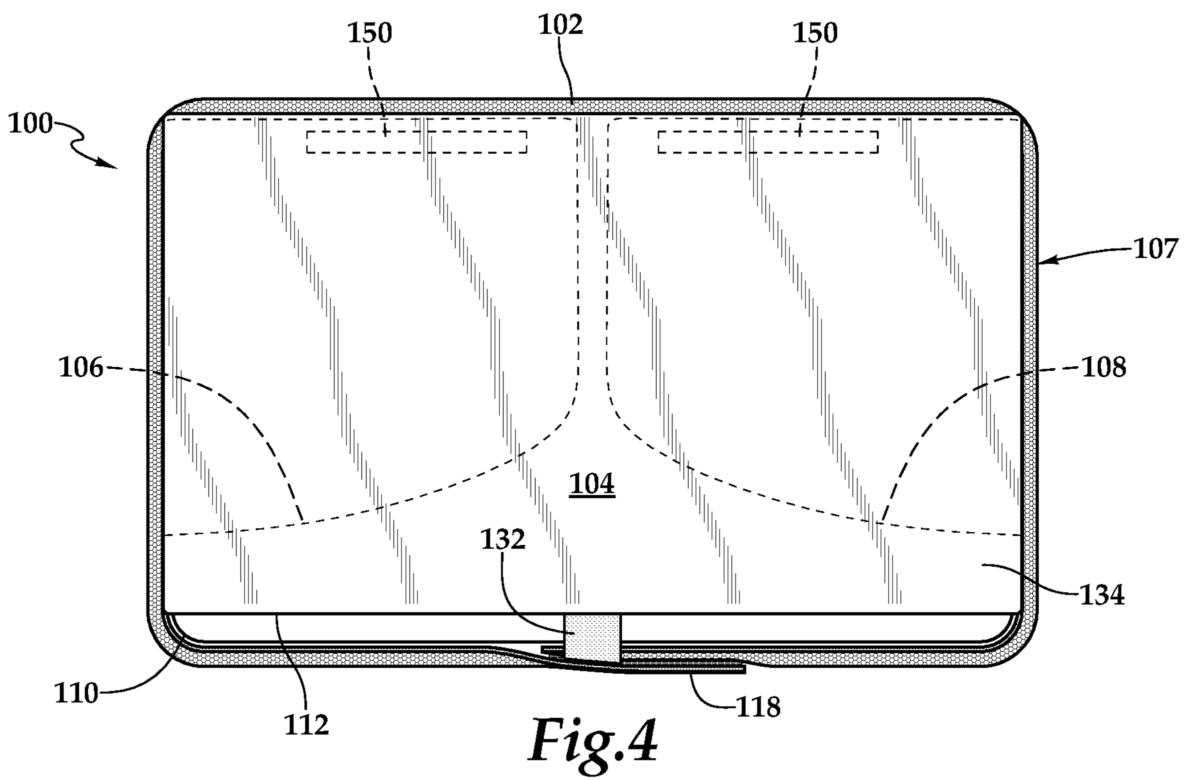
FIG. 4 is a front view of the adjustable sunshade of FIG. 1 in the closed position covering a front of the electronic unit.

Turning now to the drawings wherein like numerals represent like components, FIG. 1 illustrate an exemplary adjustable sunshade 100. As shown, sunshade 100 may include a belt 102, a top panel 104, a left panel 106, and a right panel 108. As detailed below, left and right panels 106, 108 may be pivotably coupled to top panel 104 such that sunshade 100 may move between an open or unfolded configuration 105 (FIGS. 1 and 2) and a closed or folded configuration 107 (FIG. 4).

As shown in FIG. 1, belt 102 may be configured to secure to a perimeter 110 of an electronics unit 112, such as marine electronics including, for example, fish finders and navigation. Belt 102 may be made of leather, fabric, rubber, a synthetic material, or another suitable flexible or elastic material for accommodating electronic units of various sizes and dimensions. For example, belt 102 may be configured to secure to a perimeter of an electronics unit having a diagonal ranging between about five inches and about thirty inches, and preferably a diagonal between about ten inches and about twenty inches.

More specifically, belt 102 may include a top surface 114 and a bottom surface 116. Top surface 114 may include a layer of fastening elements for coupling with a tongue 118 attached to one or more ends of said belt having corresponding fastening elements. For instance, top surface 114 may include a layer of hook and loop connectors configured to engage corresponding hook and loop connectors of tongue 118.

Bottom surface 116 of belt 102 may include a layer of grip material or strips of a friction-enhancing material to prevent belt 102 from slipping off perimeter 110 of electronic unit 112. Exemplary materials for grip portions of bottom surface may include neoprene rubber, silicone rubber, polyurethane, PVC coated woven polyester, polyester substrate, latex and other elastomers.

Figures 2, 3:
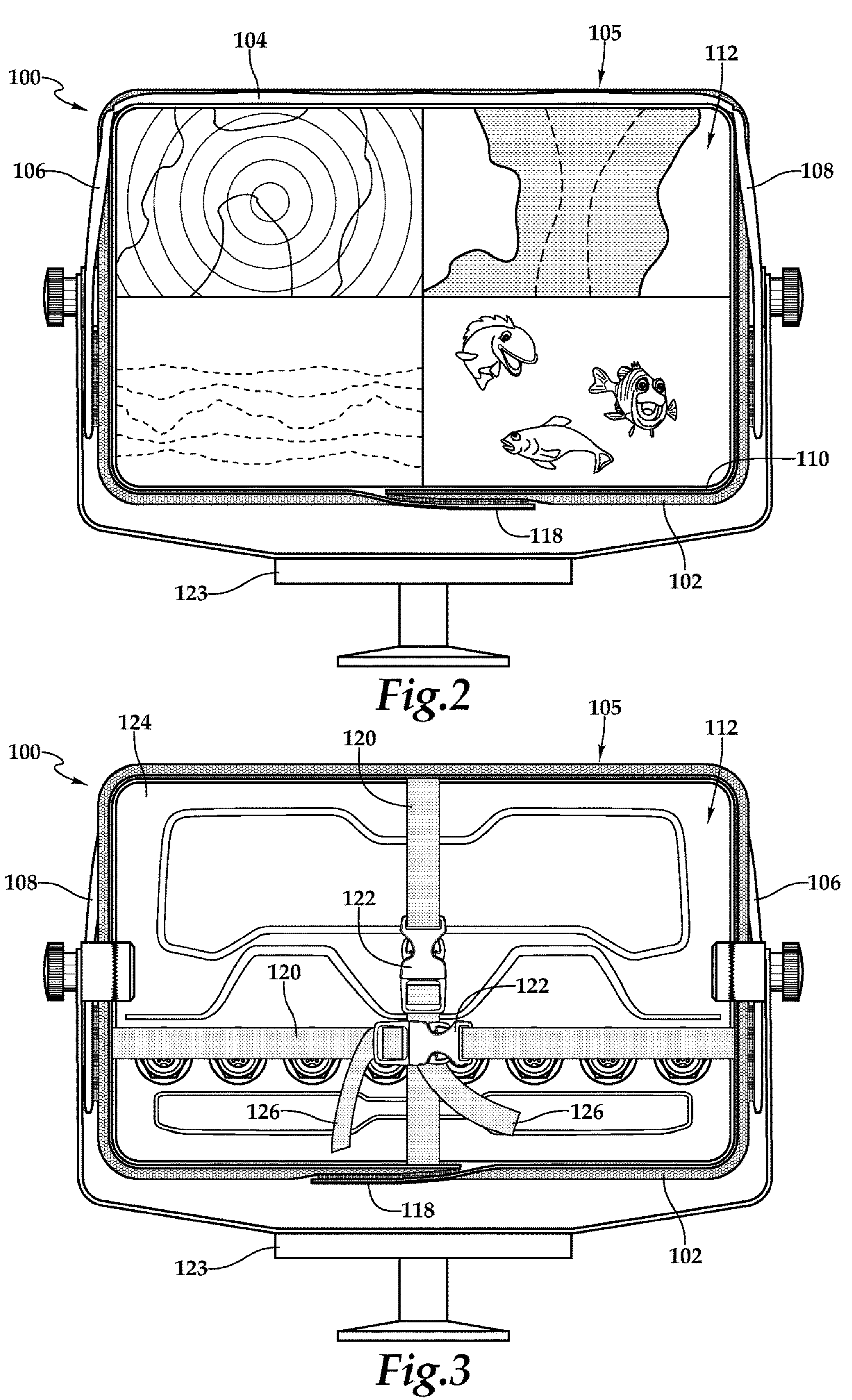
FIG. 2 is a front view of the adjustable sunshade of FIG. 1 in the open position on the electronic unit.
FIG. 3 is a rear view of the adjustable sunshade of FIG. 1 illustrating straps connected via fasteners across a back surface of the electronic unit.
Figure 5:
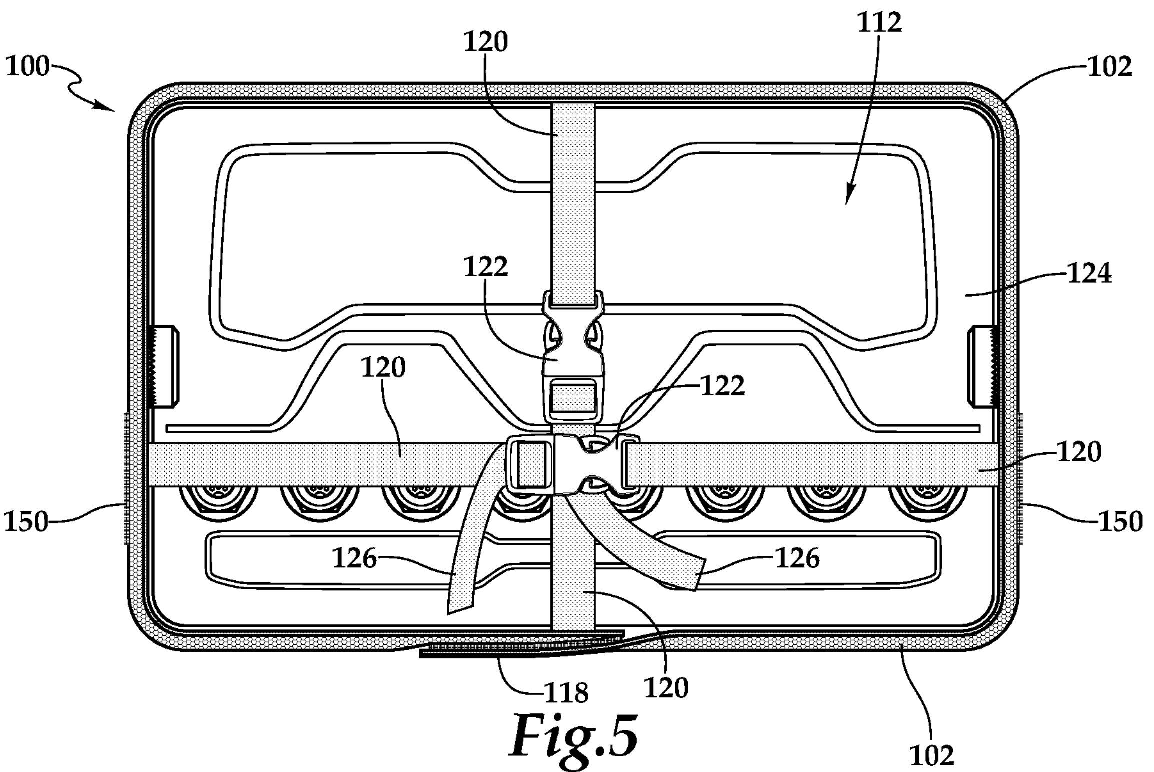
FIG. 5 is a rear view of the adjustable sunshade of FIG. 1 in the closed position on the electronic unit.
Figures 6, 7:
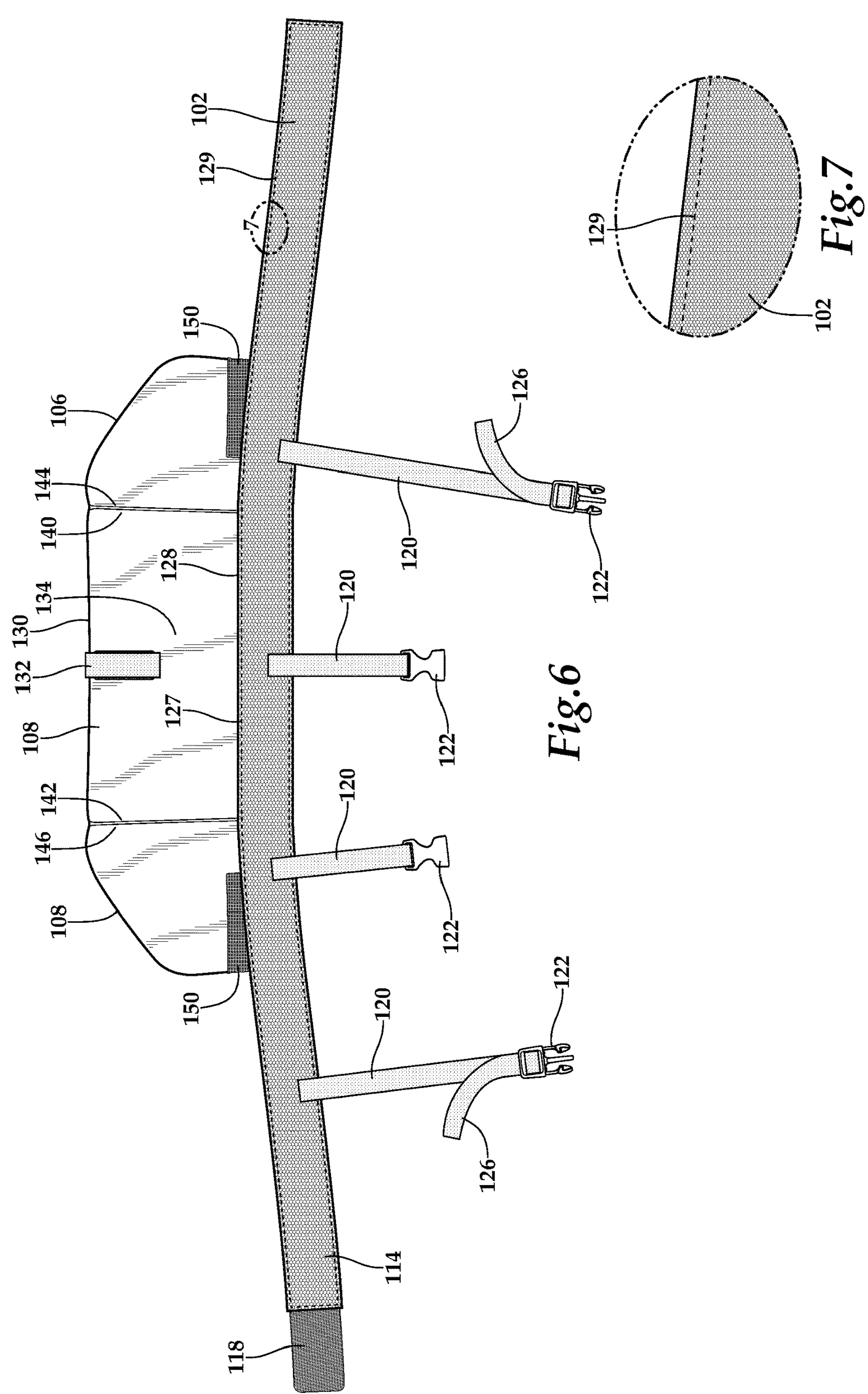
FIG. 6 illustrates the exemplary adjustable sunshade of FIG. 1.
FIG. 7 illustrates a stitching for connecting the panels to a belt of the adjustable sunshade of FIG. 1.

As shown in FIGS. 3, 5, and 6, one or more straps 120 may couple with belt 102. Straps 120 may be configured to detachably couple with one another to, for example, provide additional support and secure sunshade 100 to electronic unit. In particular, each strap may include a fastener 122 having a female or male connectors for releasably connecting to a corresponding female or male connectors. Other connectors are contemplated, such as clips, buckles, clasps, hooks, snap hooks, bolt snaps, D-rings, clip locks and other suitable attachments.

As illustrated in FIGS. 3 and 5, straps 120 may be connected via fasteners 122 across a back surface 124 of electronic unit 112. Further, fasteners 122 may facilitate adjusting of straps 120 to for securing or detaching sunshade 100 from electronic unit 112 without the use of hardware, even when electronic unit 112 is mounted on a bracket 123. For example, straps 120 may be tightened or loosened around electronics unit 112 by pulling or releasing a loose end 126 through a tension lock of fasteners 122.

As illustrated in FIG. 6, belt 102 may be coupled to top panel 104. More specifically, belt 102 may be connected to a rear edge 128 of top panel 104 via a continuous seam 127. For example, belt 102 and rear edge 128 may be sewn together such that top panel 104 may fold approximately ninety degrees in relation to belt 102.

In addition to continuous seam 127, as shown in FIG. 7, a reinforcement stitch 129 may be sewn to add rigidity to sunshade 100. Specifically, reinforcement stitch 129 may be sewn along a perimeter of belt 104 to, for example, provide additional structure, and prevent excessive stretching of belt 104. Further, reinforcement stitch 129 may prevent sagging of sunshade 100 in relation to electronic unit 112, especially for larger size marine electronics. Similar to the continuous seam, the reinforcing stitch does not interfere with the folding of top panel 104 and side panels 106, 108.

Top panel 104 may further include a front edge 130. Front edge 130 may be coupled with a grip 132. Grip 132 may assist a user in moving sunshade 100 between an open position 105 and a closed position 107. Further, grip 132 may couple with a top surface 134 and a bottom surface 136. For instance, top and bottom surfaces 134, 136 may include a connector 138, such as a hook and loop fastener, configured to attach and secure grip 132.

As shown in FIGS. 1 and 6, top panel 104 may be secured to edges of left panel 106 and right panel 108, such as via sewing. Each side panel 106, 108 may be pivotably connected to top panel 104 for movement between an open position 105 and an closed position 107, as detailed below. More specifically, top panel 104 may include a right edge 140 and a left edge 142. Right edge 140 of top panel 104 may be pivotably coupled to left edge 144 of right panel 108. Left edge 142 of top panel 104 may be pivotably coupled to right edge 146 of left panel 106.

Top panel 104 and side panels 106, 108 may include layers of material having different properties. For example, an outer layer may be made of a waterproof or water-resistant material, such as a plastic material or a fabric material. An inner layer may be made of a rigid material or structural resilient materials that provide structure and stability to the panels. In certain embodiments, inner layer may be a corrugated hard poly-fill and outer layer may be ultra-violet treated, water resistant polyester material. Other layers are contemplated, such as layers including pliable materials that provide shock absorption and securing attributes.

As further illustrated, right and left panels 106, 108 may further include a rear edge 148. Rear edge 148 may be detachably attached to belt 102. For instance, all or a portion of edge 148 may include connectors 150, such as hook and loop connectors configured to engage corresponding hook and loop connectors of top surface 114 of belt 102. As above, other suitable connections are contemplated for attaching side panels 106, 108 to belt 102 for moving sunshade 100 between an open position 105 and a closed position 107.

FIGS. 1-3 illustrate sunshade 100 in open position 105. As shown, in open position 105, straps 120 may be connected via fasteners 122 and side panels 106, 108 may be attached via connectors 150 to belt 102 such that each side panel 106, 108 is generally normal to top panel 104. As a result of each panel's position, a space may be defined for viewing a screen of electronic unit 112. Moreover, panels 104, 106, 108 are configured to extend a distance from electronic unit 112 to form a shield or guard the screen from, for example sun, rain, snow, ice and other weather conditions. For example, panels 104, 106, 108 may be configured to extend a distance ranging between about five inches and about twenty inches from electronic unit 112, and preferably between about eight inches and about sixteen inches. It is further contemplated that top panel 104 and/or side panels 106, 108 may be expandable to provide added shade or protection to electronic unit 112.

As mentioned above, sunshade 100 may be configured to move from open position 105 to closed position 107, as shown in FIGS. 4-5. In closed position 107, for example, sunshade 100 may act as a screen protector when electronic unit 112 is detached from bracket 123. In an exemplary operation, when sunshade 100 is not in use, an operator may detach side panels 106, 108 from belt 102 and uncouple fasteners 122 of straps 120. Side panels 106, 108 may then be folded flat against top panel 104. In other words, an interior surface 152 of side panels 106, 108 may rest against bottom surface 136 of top panel 104. Once folded, the operator may use grip 132 to fold top panel 104 and side panels 104, 106 downwardly such that an exterior surface 152 of side panels 104, 106 is flush against the screen of electronic unit 112. To prevent sunshade 100 moving back to open position 105, as shown in FIG. 4, grip 132 may be detachably coupled to belt 102 and/or tongue 118.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described in the application are to be taken as examples of embodiments. Components may be substituted for those illustrated and described in the application, parts and processes may be reversed, and certain features of the invention may be utilized independently, all as would be apparent to one skilled in the art after having the benefit of this description of the invention. Changes may be made in the elements described in the application without departing from the spirit and scope of the invention as described in the following claims.

The invention claimed is:

1. An adjustable sunshade comprising:

a top panel;

a left side panel and a right side panel, each side panel pivotably connected to said top panel for movement between a folded position and an unfolded position;

a flexible belt secured and fixed to a rear edge of said top panel via a continuous seam, wherein the flexible belt is sewn to the rear edge of said top panel, said flexible belt configured to be removably secured around a perimeter of an electronic unit mounted on a watercraft such that, in the unfolded position, said top panel and said side panels are configured to shade a screen of said electronic unit during operation of the watercraft;

a first pair of straps coupled to the flexible belt and attached to each other across a back surface of said electronic unit via a first fastener; and a second pair of straps coupled to the flexible belt and attached to each other across the back surface of said electronic unit via a second fastener, wherein said left and said right panels are removably coupled to said belt via a hook and loop fastener, and wherein the first pair of straps are perpendicular to the second pair of straps.

2. The adjustable sunshade of claim 1, wherein each side panel is configured to removably attach to said belt via one or more fasteners.

3. The adjustable sunshade of claim 1, wherein said side panels, in the unfolded position, are generally normal to said top panel.

4. The adjustable sunshade of claim 1, wherein said side panels are configured to fold flat against a bottom surface of said top panel in the folded position.

5. The adjustable sunshade of claim 1, wherein one or more ends of said belt is configured to removably couple with a surface of said belt via a hook and loop fastener for securing said belt to the perimeter of the electronic unit.

6. The adjustable sunshade of claim 1, wherein said belt includes a non-slip material for gripping the perimeter of the electronic unit.

7. The adjustable sunshade of claim 1, wherein said belt further includes a reinforcement stitch, said reinforcement stitch configured to provide additional structure and prevent excessive stretching of said belt.

8. The adjustable sunshade of claim 1, further comprising two or more straps coupled to said belt.

9. The adjustable sunshade of claim 8, wherein said two or more straps are configured to be connected across a back surface of the electronic unit.

10. An adjustable sunshade for marine electronics, said sunshade comprising:

a top panel having a back edge, a left edge, and a right edge;

a left panel having a right edge and a rear edge, said right edge of said left panel pivotably coupled to said left edge of said top panel;

a right panel having a left edge and a rear edge, said left edge of said right panel pivotably coupled to said right edge of said top panel;

a flexible belt connected and fixed to said rear edge of said top panel via a continuous seam, wherein the flexible belt is sewn to the rear edge of said top panel, said flexible belt further configured to be secured to a perimeter of an electronic unit mounted to a watercraft;

a first pair of straps coupled to the flexible belt and attached to each other across a back surface of said electronic unit via a first fastener; and a second pair of straps coupled to the flexible belt and attached to each other across the back surface of said electronic unit via a second fastener, wherein said left and said right panels are removably coupled to said belt via a hook and loop fastener, wherein the first pair of straps are perpendicular to the second pair of straps, and wherein said top, left, and right panels are configured to move between a folded position and an unfolded position such that, in the folded position, interior surfaces of said left and right panels are configured to fold flat against a bottom surface of said top panel and, in the unfolded position, said rear edges of said left and said right panels are configured to removably coupled to said belt for shading a screen of the electronic unit during operation of the watercraft.

11. The adjustable sunshade of claim 10, wherein said top, left, and right panels include an outer layer and an inner layer.

12. The adjustable sunshade of claim 11, wherein said outer layer comprises a water-resistant fabric material.

13. The adjustable sunshade of claim 11, wherein said inner layer comprises a rigid material.

14. The adjustable sunshade of claim 10, further comprising two or more straps coupled to said belt.

15. The adjustable sunshade of claim 14, wherein said two or more straps are configured to be connected across a back surface of the electronic unit.

16. The adjustable sunshade of claim 10, wherein said belt further includes a reinforcement stitch, said reinforcement stitch configured to provide additional structure and prevent excessive stretching of said belt.

17. The adjustable sunshade of claim 10, wherein said left and said right panels are removably coupled to said belt via a hook and loop fastener.

18. The adjustable sunshade of claim 10, wherein one or more ends of said belt are configured to fasten to a surface of said belt for securing said belt to the perimeter of the electronics unit.

19. The adjustable sunshade of claim 10, wherein, in said unfolded position, a space is formed between said top, left, and right panels for viewing the screen of the electronic unit.

20. The adjustable sunshade of claim 10, wherein, in said folded position, exterior surfaces of said left and right panels are configured to fold flush against the electronic unit and act as a screen protector.

* * * * *